US012784246B2

(12) United States Patent
Mai et al.

(10) Patent No.: US 12,784,246 B2
(45) Date of Patent: Nov. 3, 2026

(54) INFORMATION PROCESSING APPARATUS, GENERATION METHOD, AND COMPUTER PROGRAM PRODUCT HAVING AN ESTIMATION MODEL USED TO ESTIMATE DEPTH FROM AN IMAGE

(71) Applicant: KABUSHIKI KAISHA TOSHIBA, Tokyo (JP)

(72) Inventors: Weijun Mai, Ota (JP); Atsushi Kawasaki, Yokohama (JP); Nao Mishima, Inagi (JP); Tomoki Watanabe, Inagi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 264 days.

(21) Appl. No.: 18/645,674

(22) Filed: Apr. 25, 2024

(65) Prior Publication Data

US 2025/0086816 A1 Mar. 13, 2025

(30) Foreign Application Priority Data

Sep. 11, 2023 (JP) ................................ 2023-146635

(51) Int. Cl.
*G06T 7/55* (2017.01)
*G06T 7/246* (2017.01)

(52) U.S. Cl.
CPC ................ *G06T 7/55* (2017.01); *G06T 7/248* (2017.01); *G06T 2207/20081* (2013.01)

(58) Field of Classification Search
CPC .... G06T 7/20; G06T 7/50; G06T 7/55; G06T 7/70; G06T 7/80; G06T 7/579;
(Continued)

(56) References Cited

U.S. PATENT DOCUMENTS

2018/0075315 A1* 3/2018 Gu .......................... G06T 7/593
2019/0122373 A1* 4/2019 Natroshvili ............ G06V 10/82
(Continued)

FOREIGN PATENT DOCUMENTS

CN 111899277 A 11/2020
CN 112348843 A * 2/2021 ............ G06N 3/045
(Continued)

OTHER PUBLICATIONS

Chen et al, Self-supervised Learning with Geometric Constraints in Monocular Video, 2019, IEEE/CVF, International Conference on Computer Vision (ICCV), 7062-7071 (Year: 2019).*
(Continued)

*Primary Examiner* — John Villecco
*Assistant Examiner* — Michael M Sofroniou
(74) *Attorney, Agent, or Firm* — Oblon, McClelland, Maier & Neustadt, L.L.P.

(57) ABSTRACT

According to an embodiment, an information processing apparatus includes one or more hardware processors. The one or more hardware processors update parameters of the first estimation model and the second estimation model so as to optimize a first loss function including a term indicating a difference between the correspondence information and correspondence training data that is training data concerning correspondence between the first pixel and the second pixel, a second loss function including a term concerning a depth, and a third loss function including a term indicating a difference in pixel value between the first pixel and the second pixel whose correspondence is indicated by the correspondence information, and generate the first estimation model and the second estimation model represented by the updated parameters.

12 Claims, 4 Drawing Sheets

(58) Field of Classification Search
CPC . G06T 2207/10016; G06T 2207/10028; G06T 2207/20081; G06T 2207/20084; G06T 2207/30244; G06N 3/045; G06N 3/0985; G06V 10/457; G06V 10/751; G06V 10/757
See application file for complete search history.

(56) References Cited

U.S. PATENT DOCUMENTS

| | | | | |
|---|---|---|---|---|
| 2019/0333231 | A1* | 10/2019 | Zhu | G01C 11/04 |
| 2020/0051290 | A1* | 2/2020 | Yang | G06T 11/10 |
| 2020/0211206 | A1* | 7/2020 | Wang | G06T 7/579 |
| 2020/0258249 | A1 | 8/2020 | Angelova et al. | |
| 2020/0402250 | A1 | 12/2020 | Angelova et al. | |
| 2022/0292701 | A1 | 9/2022 | Mahjourian et al. | |
| 2022/0301212 | A1* | 9/2022 | Guizilini | G06T 7/55 |
| 2022/0301252 | A1* | 9/2022 | Wang | G06T 15/506 |
| 2022/0343521 | A1* | 10/2022 | Wofk | G06T 7/50 |
| 2023/0394693 | A1* | 12/2023 | Kuo | G06T 7/55 |
| 2023/0410338 | A1* | 12/2023 | Liu | G06V 20/46 |

FOREIGN PATENT DOCUMENTS

| | | | | |
|---|---|---|---|---|
| DE | 102017207789 | A1 * | 11/2018 | G01C 11/08 |
| JP | 2019-16275 | A | 1/2019 | |
| JP | 2020-8984 | A | 1/2020 | |
| JP | 2021-503134 | A | 2/2021 | |
| JP | 2023-18472 | A | 2/2023 | |
| WO | WO-2019099684 | A1 * | 5/2019 | G06N 3/045 |

OTHER PUBLICATIONS

Mai et al, Feature-aided Bundle Adjustment Learning Framework for Self-supervised Monocular Visual Odometry, 2021, IEEE/RSJ, International Conference on Intelligent Robots and Systems (IROS), 9160-9167 (Year: 2021).*
Wang et al, MVDepthNet: Real-time Multiview Depth Estimation Neural Network, 2018, IEEE, International Conference on 3D Vision, 248-257 (Year: 2018).*
Tinghui Zhou, et al., "Unsupervised Learning of Depth and Ego-Motion from Video," Proceedings of the IEEE conference on computer vision and pattern recognition, 2017, 10 pages.
Jiading Fang, et al., "Self-Supervised Camera Self-Calibration from Video," International Conference on Robotics and Automation, ICRA 2022, 8 pages.
Japanese Decision to Grant issued on Jan. 13, 2026 in Japanese Patent Application No. 2023-146635 (with unedited computer-generated English translation), 3 pages.

* cited by examiner

INFORMATION PROCESSING APPARATUS, GENERATION METHOD, AND COMPUTER PROGRAM PRODUCT HAVING AN ESTIMATION MODEL USED TO ESTIMATE DEPTH FROM AN IMAGE

CROSS-REFERENCE TO RELATED APPLICATIONS

This application is based upon and claims the benefit of priority from Japanese Patent Application No. 2023-146635, filed on Sep. 11, 2023; the entire contents of which are incorporated herein by reference.

FIELD

Embodiments described herein relate generally to an information processing apparatus, a generation method, and a computer program product.

BACKGROUND

A technology is proposed to learn a neural network that estimates a depth and a neural network that estimates egomotion (camera motion), by using a difference in brightness between images based on a geometric relationship between the depth and the egomotion.

In such a technology, for example, in the egomotion, only the motion of stationary background captured in an image is modeled without considering a moving object. Therefore, for example, the neural network that estimates the depth may not be capable of highly accurately estimating the depth (distance) to the moving object.

DETAILED DESCRIPTION

Figure 1:
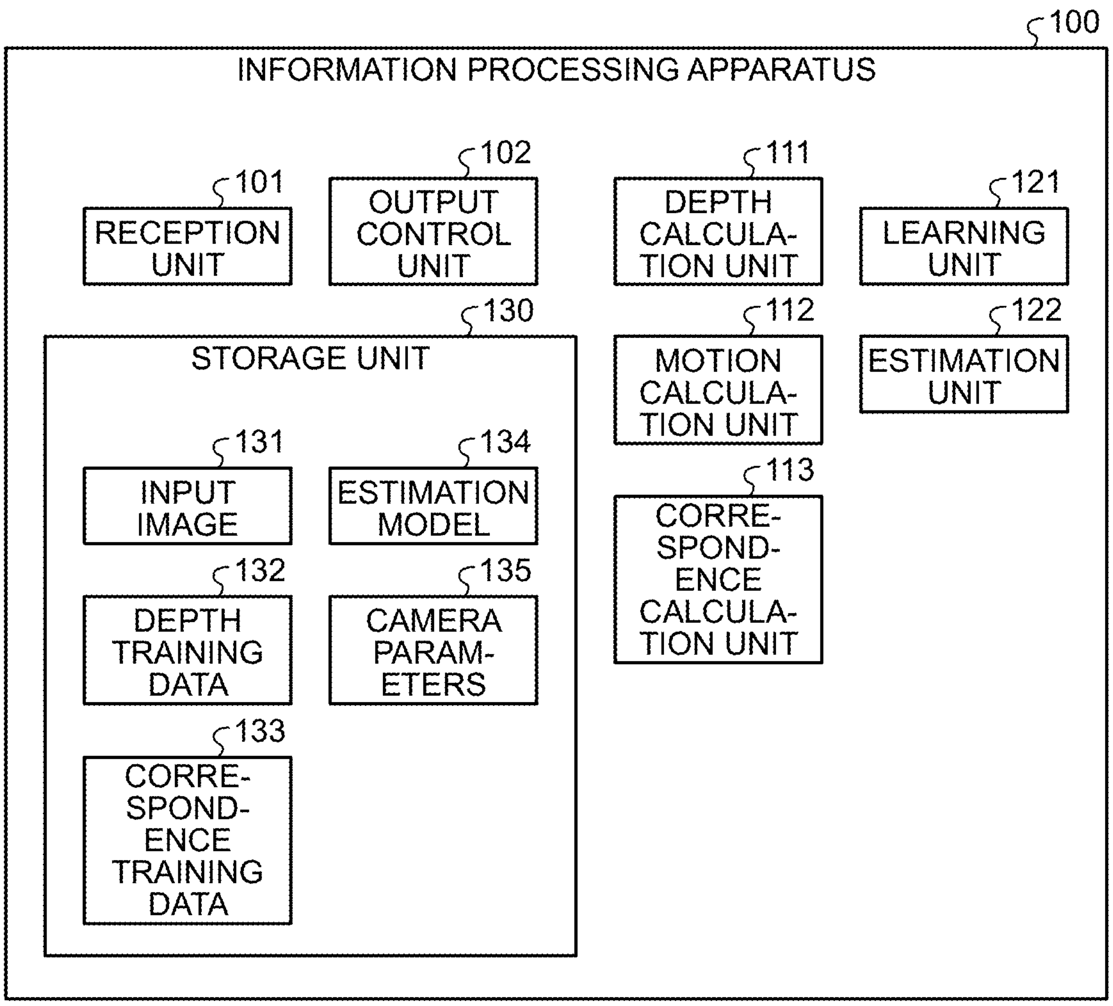
FIG. 1 is a block diagram of a configuration of an information processing apparatus according to an embodiment.

According to an embodiment, an information processing apparatus includes one or more hardware processors configured to function as a depth calculation unit, a motion calculation unit, a correspondence calculation unit, and a learning unit. The depth calculation unit inputs a first input image and a second input image that are captured by an imaging device, to a first estimation model into which an input image is input and from which depth information including a plurality of depths for a plurality of pixels included in the input image is output, and obtains first depth information for the first input image and second depth information for the second input image. The motion calculation unit inputs the first depth information and the second depth information, to a second estimation model into which two pieces of the depth information are input and from which motion information indicating motion of each of a plurality of pixels in a three-dimensional space is output, and obtains the motion information. The correspondence calculation unit, by using the first depth information and the second depth information, the motion information, and camera parameters of the imaging device, calculates correspondence information indicating correspondence between a first pixel included in the first input image and a second pixel included in the second input image. The learning unit updates parameters of the first estimation model and the second estimation model to optimize a first loss function including a term indicating a difference between the correspondence information and correspondence training data that is training data concerning correspondence between the first pixel and the second pixel, a second loss function including a term concerning a depth, and a third loss function including a term indicating a difference in pixel value between the first pixel and the second pixel whose correspondence is indicated by the correspondence information. Then, the learning unit generates the first estimation model and the second estimation model represented by the updated parameters.

Hereinafter, preferred embodiments of an information processing apparatus, a generation method, and a computer program product according to the present disclosure will be described in detail with reference to the accompanying drawings.

The information processing apparatus according to an embodiment not only models the motion of stationary part such as background in an image but also models the motion of a moving object, and learns an estimation model that estimates a depth. This configuration makes it possible to highly and accurately estimate the depth by using the estimation model.

In the present embodiment, at least the following two models are used.

Estimation model MA: a model (first estimation model) into which an input image is input and from which depth information including a plurality of depths for a plurality of pixels included in the input image is output.

Estimation model MB: a model (second estimation model) into which two pieces of depth information obtained for two input images are input and from which motion information indicating the motion of each of a plurality of pixels in a three-dimensional space is output.

Parameters of the two estimation models are updated to optimize loss functions for the two estimation models as described above, and the estimation models are learned (generated and constructed). The estimation model MA that estimates the depth is learned together with the estimation model MB that models the motion of the moving object, making it possible to highly accurately generate the estimation model MA.

Furthermore, in the present embodiment, camera parameters of an imaging device are trained as a learnable parameter, together with the parameters of the estimation models. The camera parameters are obtained by learning, thus, eliminating the need for calibration in advance for obtaining the camera parameters. The camera parameters include, for example, at least one of a focal length of the imaging device, a principal point position of the imaging device, and a distortion coefficient of the imaging device.

FIG. 1 is a block diagram illustrating an exemplary configuration of an information processing apparatus 100 according to an embodiment. As illustrated in FIG. 1, the information processing apparatus 100 includes a reception unit 101, a depth calculation unit 111, a motion calculation unit 112, a correspondence calculation unit 113, a learning unit 121, an estimation unit 122, an output control unit 102, and a storage unit 130.

The reception unit 101 receives inputs of various information used by the information processing apparatus 100. For example, the reception unit 101 receives inputs of an input image used for learning or estimation and training data used for the learning.

The input image is, for example, a plurality of images captured by a camera (imaging measure) at a plurality of time points. The plurality of images includes, for example, an input image IA (first input image) and an input image IB (second input image) captured at a time point different from the time point at which the input image IA is captured. The camera is, for example, a monocular camera.

The training data includes depth training data that is training data concerning depth and correspondence training data that is training data concerning correspondence between pixels in two images. The depth training data may be obtained by any method, but can be obtained by, for example, a method using a system that estimates a depth from one image or a method using a system that estimates a depth from a plurality of images. The correspondence training data may be obtained by any method, but can be obtained by, for example, a method using a system that estimates correspondence on the basis of optical flow or a method using a system that estimates correspondence on the basis of corresponding points.

The depth calculation unit 111 uses the estimation model MA to calculate the depth information of the input images. For example, the depth calculation unit 111 inputs the input image IA and the input image IB to the estimation model MA, and obtains depth information DA (first depth information) for the input image IA and depth information DB (second depth information) for the input image IB.

The estimation model MA may be a model that outputs a reliability of each piece of depth information together with the depth information. The reliability is used, for example, in a learning process by the learning unit 121. Hereinafter, the reliability of the depth information DA may be referred to as a reliability RA (first reliability), and the reliability of the depth information DB may be referred to as a reliability RB (second reliability).

Note that the reliability indicates whether a depth estimated for each pixel of each input image is reliable. For example, when an estimated depth is reliable, a larger value than that when an estimated depth is unreliable is calculated as the reliability. For example, when the depths in an image captured in an urban area are estimated, background pixels are around the contour of a moving object such as an automobile and a pedestrian, and therefore, pixels corresponding to the entire moving object are likely to be erroneously recognized as the background. In other words, the depths of the pixels corresponding to the entire moving object are estimated as a value indicating a position farther than the actual position. In such a case, a small value (a value indicating unreliability) is calculated for the reliability.

The motion calculation unit 112 uses two pieces of depth information calculated for the two input images to calculate the motion information for each of a plurality of pixels included in each of the input images. For example, the motion calculation unit 112 inputs the depth information DA and the depth information DB to the estimation model MB to obtain the motion information.

Each of the estimation model MA and the estimation model MB may be a model of any structure, and is, for example, a neural network model (hereinafter, also simply referred to as a neural network) or a machine learning model such as random forest. The neural network includes, for example, a convolutional neural network, a fully connected neural network, a recurrent neural network, Transformer, and the like.

Hereinafter, an example where the estimation model MA and the estimation model MB are neural networks will be mainly described. Parameters updated in learning of each of the neural networks are, for example, a weight (weight coefficient) and a bias. Hereinafter, a parameter of the estimation model MA is referred to as a parameter PA, and a parameter of the estimation model MB is referred to as a parameter PB.

Each neural network may be trained by any method, but is trained by, for example, a gradient descent method. In the gradient descent method, a value obtained by differentiating the loss function is used. Therefore, each of the models and loss functions is represented by a differentiable function.

The correspondence calculation unit 113 uses the depth information DA and the depth information DB, the motion information, and the camera parameters of the imaging device to calculate correspondence information indicating correspondence between a pixel PXA (first pixel) included in the input image IA and a pixel PXB (second pixel) included in the input image IB, on the basis of a geometric relationship between the respective pieces of information.

Here, the functions of the depth calculation unit 111, the motion calculation unit 112, and the correspondence calculation unit 113 will be described in detail.

Figure 2:
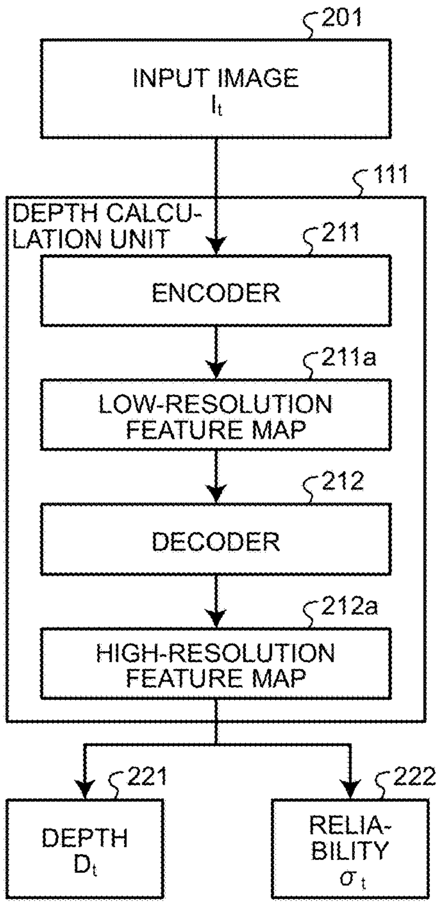
FIG. 2 is a block diagram illustrating an exemplary configuration of a depth calculation unit.

FIG. 2 is a block diagram illustrating an exemplary configuration of the depth calculation unit 111. As illustrated in FIG. 2, the depth calculation unit 111 inputs an input image 201 into the estimation model MA, and calculates a depth 221 and a reliability 222. The input image 201 is, for example, an image captured at time point t. Hereinafter, the input image captured at time point t may be referred to as an input image $I_t$, and the depth and reliability calculated from the input image $I_t$ may be referred to as a depth $D_t$ and a reliability $\sigma_t$.

In the example of FIG. 2, the estimation model MA used by the depth calculation unit 111 includes an encoder 211 and a decoder 212. In the encoder 211, the input image 201 is input and a low-resolution feature map 211*a* indicating the features of the input image 201 is calculated. In the decoder 212, the low-resolution feature map 211*a* is input and a high-resolution feature map 212*a* having a resolution the same as that of the input image is calculated. The estimation model MA calculates the depth 221 and the reliability 222 from the feature map 212*a*. The depth calculation unit 111 uses the estimation model MA having such a configuration to calculate the depth 221 and reliability 222 for the input image 201.

For example, for each of the two input images received by the reception unit 101, the depth calculation unit 111 calculates and outputs the depth and reliability by the processing as described above.

The encoder 211 and the decoder 212 can also be taken to correspond to a model included in the estimation model MA. The encoder 211 and the decoder 212 are also represented by differentiable functions.

The depth calculation unit 111 may divide the input image 201 into a plurality of divided images and combine a plurality of depths and reliabilities obtained by applying the estimation model MA to each of the plurality of divided images to calculate the depth and reliability of the input image 201.

Figure 3:
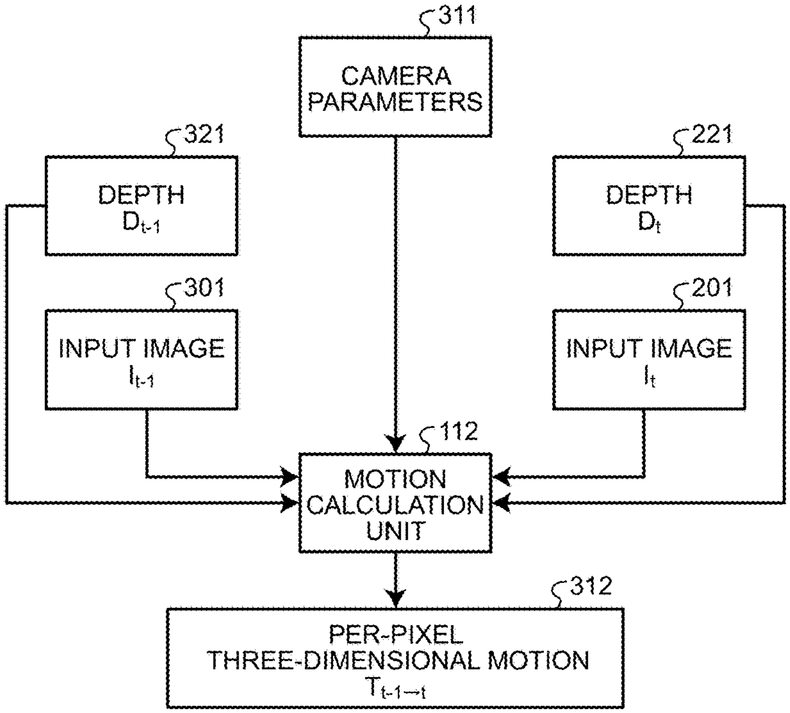
FIG. 3 is a block diagram illustrating an exemplary configuration of a motion calculation unit.

Next, details of the motion calculation unit 112 will be described. FIG. 3 is a block diagram illustrating an exemplary configuration of the motion calculation unit 112.

The motion calculation unit 112 uses the estimation model MB to calculate a per-pixel three-dimensional motion 312 for each of a plurality of pixels included in the input image 201 and an input image 301. Information including the three-dimensional motions 312 of the plurality of pixels corresponds to the motion information.

The motion calculation unit 112 inputs the input image 201, the input image 301, the depth 221, a depth 321, and camera parameters 311 to the estimation model MB. The input image 301 is, for example, an image captured at time point t−1. The depth 321 is a depth calculated for the input image 301. Hereinafter, the input image captured at time point t−1 may be referred to as an input image $I_{t-1}$, and the depth (depth 321) and reliability calculated from the input image $I_{t-1}$ may be referred to as a depth $D_{t-1}$ and a reliability $\sigma_{t-1}$.

The estimation model MB calculates and outputs the three-dimensional motion 312 to move to a viewpoint of the input image 201, for each pixel of the input image 301. For example, the motion calculation unit 112 converts the per-pixel three-dimensional motion 312 into optical flow, aligns the viewpoints of the input image 201 and the input image 301, inputs input data (the input image 201, input image 301, depth 221, and depth 321) to the estimation model MB again, and calculates new per-pixel three-dimensional motion 312.

Note that the estimation model MB may share some layers (and parameters of the layers) with the estimation model MA.

It is assumed that the motion calculation unit 112 is operable to repeat estimation of the per-pixel three-dimensional motion 312, conversion into the optical flow, alignment of the viewpoints, and estimation of the new per-pixel three-dimensional motion 312 many times.

Furthermore, in order to reduce the amount of calculation, the motion calculation unit 112 may obtain per-pixel three-dimensional motions of lower resolution, from the input data (the input image 201, input image 301, depth 221, and depth 321) in the middle of calculation processing, and calculate data obtained by upsampling the three-dimensional motion of lower resolution to a resolution the same as that of each input image, as the three-dimensional motion 312 to be finally output.

Figure 4:
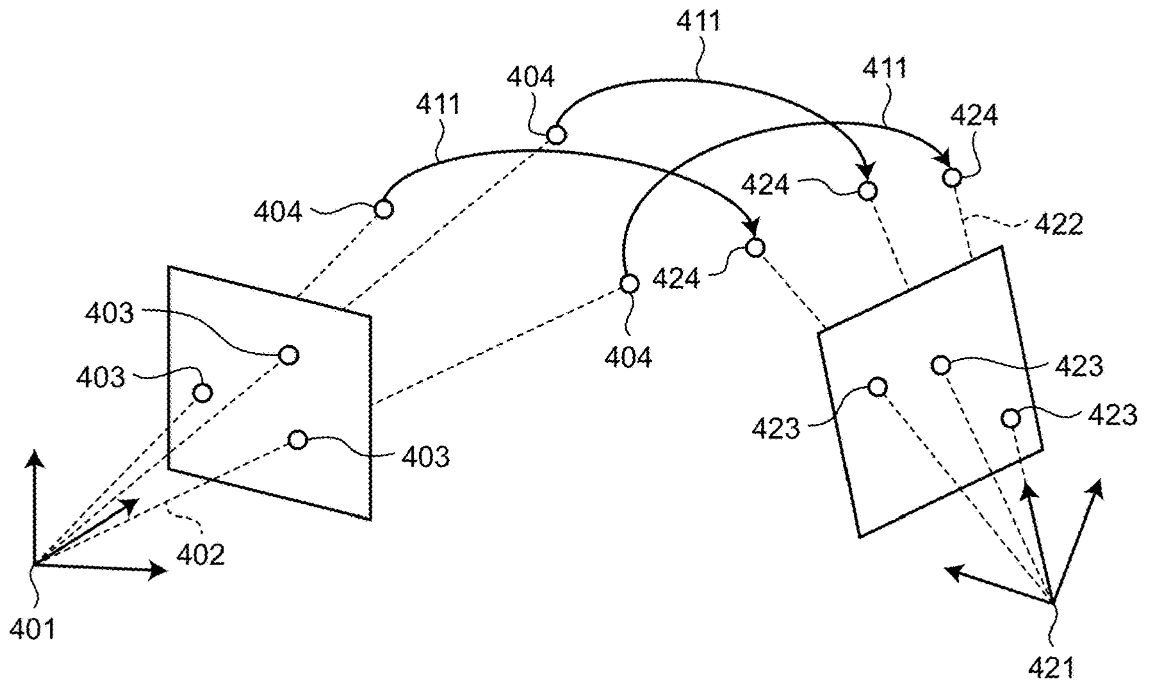
FIG. 4 is a diagram illustrating a specific example of a correspondence calculation process by a correspondence calculation unit.

Next, details of the correspondence calculation unit 113 will be described. FIG. 4 is a diagram illustrating a specific example of a correspondence calculation process by the correspondence calculation unit 113.

The correspondence calculation unit 113 calculates correspondence between the input image 201 and the input image 301, on the basis of the geometric relationship between depths calculated by the depth calculation unit 111, per-pixel three-dimensional motions 411 calculated by the motion calculation unit 112, and the set camera parameters.

Specifically, the correspondence calculation unit 113 radiates straight lines 402 from an imaging position 401 into the three-dimensional space on the basis of the camera parameters, and projects the pixels 403 back into the three-dimensional space.

Next, the correspondence calculation unit 113 determines an end point position of each of the straight lines 402 on the basis of the depth, thereby generating a position 404 in the three-dimensional space corresponding to each of the pixels 403 of the input image 301 captured from a viewpoint of the imaging position 401.

Next, the correspondence calculation unit 113 uses the three-dimensional motion 411 of the pixels 403 to move the position 404 in the three-dimensional space to a position 424 in the three-dimensional space.

Next, the correspondence calculation unit 113 projects the position 424 in the three-dimensional space onto a pixel 423 of the input image 201 captured from the viewpoint of an imaging position 421 along a straight line 422, on the basis of the set camera parameters.

In this way, the correspondence information for association between the pixel 403 and the pixel 423 is calculated. Note that a difference in position between the pixel 423 and the pixel 403 is the optical flow. The correspondence information may include the optical flow.

The correspondence calculation process can be formulated by the following Formula (1).

$$F_{t-1\to t}^{2d} = \pi\left(T_{t-1\to t}\cdot D(x_{t-1})\cdot \pi^{-1}(x_{t-1})\right) - x_{t-1} \quad (1)$$

Where $x_{t-1}$ represents the coordinates of the pixel 403, the function $\pi^{-1}$( ) represents back projection based on the camera parameters, $D(x_{t-1})$ represents the depth corresponding to the pixel 403, $T_{t-1\to t}$ represents the three-dimensional motion 411 of the pixel 403, and the function $\pi$( ) represents projection based on the camera parameters. Note that $D(x_{t-1})\cdot\pi^{-1}(x_{t-1})$ is a function to calculate the position 404 in the three-dimensional space, $T_{t-1\to t}\cdot D(x_{t-1})\cdot\pi^{-1}(x_{t-1})$ is a function to calculate the position 424 in the three-dimensional space, and $\pi(T_{t-1\to t}\cdot D(x_{t-1})\cdot\pi^{-1}(x_{t-1}))$ is a function to calculate the coordinates of the pixel 423.

Description will be made with reference to FIG. 1 again. The learning unit 121 performs the learning processes of the estimation model MA and the estimation model MB. For example, the learning unit 121 updates the parameters of the estimation model MA and estimation model MB to optimize loss functions as described below to generate the estimation model MA and the estimation model MB that are represented by the updated parameters.

A loss function LA (first loss function) including a term indicating a difference between the correspondence information and the correspondence training data. The correspondence training data is training data concerning the correspondence between the pixel PXA and the pixel PXB.

A loss function LB (second loss function) including a term of the depth.

A loss function LC (third loss function) including a term indicating a difference in pixel value between the pixels PXA and PXB whose correspondence is indicated by the correspondence information.

The learning process makes it possible to adapt the depth calculation unit 111 (estimation model MA), the motion calculation unit 112 (estimation model MB), and the camera parameters to a target scene. Details of the loss functions will be described later.

The estimation unit 122 performs an estimation process using the estimation models learned by the learning unit 121. The estimation process may be used for any purpose, but the estimation process can be applied to, for example, a technology in which a distance from an imaging position to a subject is obtained by using an image captured by the imaging device to control the moving object (vehicle such as automobile, mobile robot, or the like) using the obtained distance. The imaging device may be mounted on the moving object to be controlled.

The estimation unit 122 may perform the estimation process using one of the estimation model MA and the estimation model MB. For example, the estimation unit 122 may use the estimation model MA to perform the estimation process to estimate the depth of each input image. The estimation model MA is learned together with the estimation model MB, and therefore, the depth can be highly accurately estimated.

The output control unit 102 controls output of various information used by the information processing apparatus 100. For example, the output control unit 102 stores the parameters (parameter PA, and parameter PB) of the respective models (estimation model MA, an estimation model MB) obtained by the learning process, in the storage unit 130, or outputs the parameters to an external device (estimation device or the like) that performs processing using the models. Furthermore, the output control unit 102 displays a result of the estimation process by the estimation unit 122 on a display device such as a display, or transmits the result to an external device connected via a network.

At least some of the units (the reception unit 101, depth calculation unit 111, motion calculation unit 112, correspondence calculation unit 113, learning unit 121, estimation unit 122, and output control unit 102) may be implemented by one or more processing units. Each of the above units is implemented by, for example, one or a plurality of processors. For example, each of the above units may be implemented by causing a processor such as a central processing unit (CPU) and a graphics processing unit (GPU) to execute a program, that is, by software. Each of the above units may be implemented by a processor such as a dedicated integrated circuit (IC), that is, by hardware. Each of the above units may be implemented by the software and the hardware in combination. When a plurality of processors is used, each of the processors may implement one of the units or may implement two or more of the units.

The storage unit 130 stores various information used by the information processing apparatus. For example, the storage unit 130 stores an input image 131, depth training data 132, correspondence training data 133, estimation models 134, and camera parameters 135. The estimation models 134 include the estimation model MA and the estimation model MB.

Note that the storage unit 130 can be configured by any commonly used storage medium such as a flash memory, memory card, random access memory (RAM), hard disk drive (HDD), and an optical disc.

At least some pieces of the data (the input image 131, depth training data 132, correspondence training data 133, estimation models 134, and camera parameters 135) stored in the storage unit 130 may be stored on physically different storage mediums or may be stored in different storage areas of a physically identical storage medium.

Furthermore, the information processing apparatus 100 may be physically constituted by one apparatus or may be physically constituted by a plurality of devices. For example, the information processing apparatus 100 may be constructed in a cloud environment. Furthermore, the units in the information processing apparatus 100 may be provided so as to be distributed to a plurality of devices. For example, the information processing apparatus 100 (information processing system) may be configured to include a device (e.g., learning device) having a function (learning unit 121 or the like) necessary for the learning process and a device (e.g., estimation device) having a function (estimation unit 122 or the like) necessary for the estimation process using the trained estimation models 134.

Next, a specific example of each loss function will be described. First, an example of the loss function LA will be described.

For example, the learning unit 121 uses the loss function LA to update the parameter PA (parameter of the estimation model MA), the parameter PB (parameter of the estimation model MB), and the camera parameters so as to reduce a difference in brightness value (pixel value) between pixels of two input images corresponding to each other (hereinafter, referred to as corresponding pixels).

Note that the magnitude of the increase (decrease) when each parameter is updated may be proportional to the absolute value of a differential coefficient. In order to avoid sudden change, an upper limit of a range of the parameter change may be set.

Specifically, for example, the learning unit 121 updates the parameter PA, the parameter PB, and the camera parameters so as to minimize a loss function $L_{pho}$ as represented by the following Formula (2) (example of the loss function LA).

$$L_{pho} = d\left(I_{t-1}(p), I_t\left(p + F^{2d}_{t-1\to t}\right)\right) \tag{2}$$

Where $I_{t-1}$ and $l_t$ are the input image IA and the input image IB, respectively. p is a pixel of $l_{t-1}$, $F^{2d}{}_{t-1\to t}$ is optical flow from the input image IA to the input image IB, and the function d ( ) represents a difference in brightness value. Furthermore, p and $p+F^{2d}{}_{t-1\to t}$ are corresponding pixels.

Note that the function d ( ) may be any function as long as a difference in brightness value can be calculated. For example, the function d ( ) may be a function to calculate a difference in brightness value on the basis of a concept of distance in geometry, such as an L1 distance and an L2 distance, or may be a function to calculate perceptual similarity, such as PSNR and SSIM, as a difference in brightness value. Note that the function d ( ) may be a function obtained by combining a plurality of calculation methods. For example, the function d ( ) may be represented by a weighted sum of a plurality of functions corresponding to the plurality of calculation methods.

Next, an example of the loss function LB will be described. The learning unit 121 updates the parameter PA so that as the reliability calculated by the depth calculation unit 111 decreases, the depth calculated by the depth calculation unit 111 becomes closer to the depth training data (if the reliability calculated by the depth calculation unit 111 increases, the depth calculated by the depth calculation unit 111 does not become closer to the depth training data).

Specifically, the learning unit 121 updates the parameter PA so to minimize the absolute difference between the depth and the depth training data according to the reliability, by using, for example, a loss function as represented by the following Formula (3) (example of the loss function LB).

$$L_D^a = \frac{|D - D^T|}{\sigma} + \log(\sigma) \tag{3}$$

Where D and $D^T$ represent the depth and the depth training data, respectively. σ represents the reliability corresponding to the depth D. Note that, because actual scales for D and $D^T$ are unknown, D and $D^T$ are normalized by the following Formula (4).

$$D := \frac{D - \mathrm{median}\,(D)}{\mathrm{mean}\,(|D - \mathrm{median}\,(D)|)} \tag{4}$$

Where the function median ( ) calculates a median value of the depths of all the pixels, and the function mean ( ) calculates an average value of the depths of all the pixels. Note that the same calculation is applied to the depth training data $D^T$. Formula (4) applies only to Formula (3).

The loss function represented by Formula (3) indicates a difference between the depth information DA and depth information DB (depth D) and the depth training data (depth $D^T$) that is the training data concerning the depth, and corresponds to a function including a term indicating that the larger the reliability RA and the reliability RB (σ) are, the larger the loss is. Using the loss function configured as described above makes it possible to filter a pixel having low reliability.

Furthermore, the learning unit 121 may update the parameter PA so as to maximize a distance between pixels separated by a certain threshold or more, by using an anteroposterior relationship between the pixels obtained from the depth training data by, for example, a loss function as represented by the following Formula (5) (example of the loss function LB).

$$L_D^T = \begin{cases} \log\,(1 + \exp\,(-(D\,(p_i) - D\,(p_i)))), & l > \delta \\ \log\,(1 + \exp\,(-(D\,(p_j) - D\,(p_j)))), & l < -\delta \\ 0, & \text{otherwise} \end{cases} \tag{5}$$

Where $p_i$ and $p_j$ are randomly sampled pixels having different depths D. δ represents a hyperparameter (example of designated value) that controls a threshold in the range [0,1]. Note that 1 is an anteroposterior relationship between pixels obtained from the depth training data, and is formulated by the following Formula (6).

$$l = D^T\,(p_i) - D^T\,(p_j) \tag{6}$$

Where $D^T$ is normalized by the following Formula (7). Note that Formula (7) applies only to Formula (6).

$$D^T := \frac{D^T - \min\left(D^T\right)}{\max\left(D^T\right) - \min\left(D^T\right)} \tag{7}$$

Where $D^T$ is normalized to the range [0,1] by Formula (7) Therefore, setting of the hyperparameter δ is facilitated. For example, when δ is set to 0.1, $D(p_i)$ and $D(p_j)$ are maximized when the pixel $p_i$ and the pixel $p_j$ are separated by 10% or more.

The loss function represented by Formula (5) corresponds to a function including a term indicating a difference in depth between two pixels each having a larger difference in depth in the depth training data than a designated value.

The learning unit 121 may use either one of Formula (3) and Formula (5) or a combination of both. In the latter case, the learning unit 121 may use, for example, the loss function LB represented by the weighted sum of Formulas (3) and (5).

Next, an example of the loss function LC will be described. The learning unit 121 updates the parameter PA, the parameter PB, and the camera parameters so that the correspondence calculated by the correspondence calculation unit 113 becomes closer to the correspondence training data.

Specifically, for example, the learning unit 121 updates the parameter PA, the parameter PB, and the camera parameters so as to minimize a loss function as represented by the following Formula (8) (example of the loss function LC).

$$L_f = \left\| F^{2d}_{t-1 \to t} - F^{2d,T}_{t-1 \to t} \right\| \tag{8}$$

Where $F^{2d}_{t\text{-}1 \to t}$ is optical flow obtained by the correspondence calculation unit 113 for the input image IA and the input image IB. $F^{2d,T}_{t\text{-}1 \to t}$ is optical flow for the input image IA and the input image IB included in the correspondence training data. A difference between $F^{2d}_{t\text{-}1 \to t}$ and $F^{2d,T}_{t\text{-}1 \to t}$ in Formula (8) corresponds to a distance between $F^{2d}_{t\text{-}1 \to t}$ and $F^{2d,T}_{t\text{-}1 \to t}$. The distance may be calculated in any manner, but for example, a calculation method based on the concept of distance in geometry, such as the L1 distance and the L2 distance, can be applied.

As described above, each loss function is represented by a differentiable function. Therefore, the learning unit 121 is operable to differentiate each loss function with the parameter PA, the parameter PB, and the camera parameters to determine a direction to decrease the loss function. The learning unit 121 repeats processing of changing the parameter PA in the determined direction to update the parameter PA, the parameter PB, and the camera parameters. As a result of such update, the estimation model MA represented by the parameter PA and the estimation model MB represented by the parameter PB are generated.

The learning unit 121 updates the parameter PA, the parameter PB, and the camera parameters by a learning method such as a gradient descent method, for example so as to optimize a loss function including all the three loss functions LA, LB, and LC. Therefore, the estimation model MA that estimates the depth can be learned together with the estimation model MB that models the motion of the moving object, making it possible to highly accurately generate the estimation model MA.

Note that the learning unit 121 may use only some of the three loss functions LA, LB, and LC to further update at least some parameters of the generated models (estimation model MA and estimation model MB). In other words, the learning unit 121 may have a function of updating the parameters of the estimation model MA and estimation model MB so as to optimize one or two of the loss function LB, the loss function LC, and the loss function LA.

For example, the learning unit 121 may update the parameter PA, the parameter PB, and the camera parameters so as to optimize the loss function $L_{pho}$ represented by Formula (2). Furthermore, the learning unit 121 may update the parameter PA so as to optimize the loss function represented by Formula (3). Furthermore, the learning unit 121 may update the parameter PA, the parameter PB, and the camera parameters so as to optimize the loss function represented by Formula (8).

Figure 5:
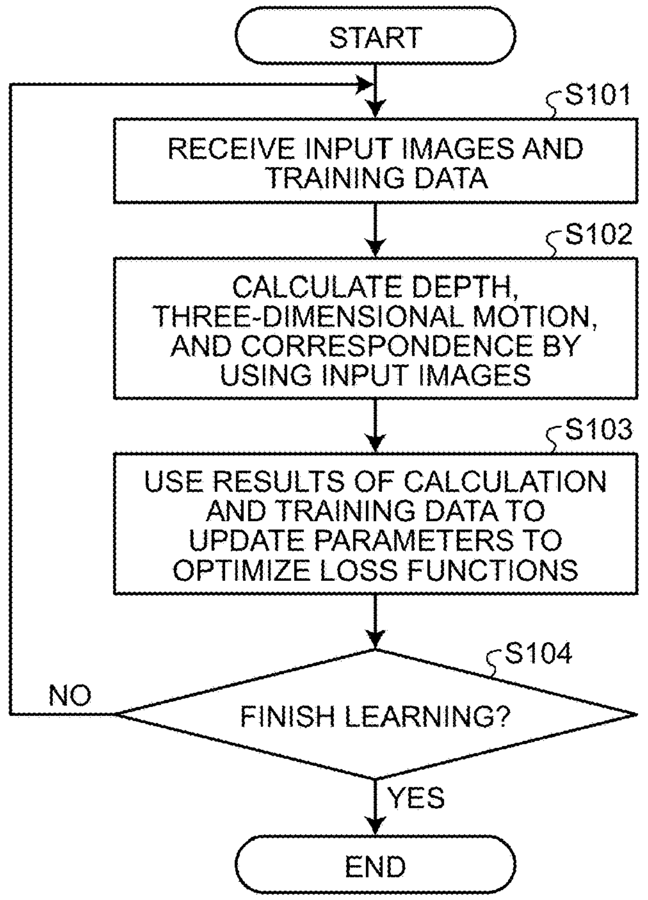
FIG. 5 is a flowchart of a learning process according to an embodiment.

Next, a learning process by the information processing apparatus 100 according to an embodiment will be described. FIG. 5 is a flowchart illustrating an example of the learning process according to an embodiment.

The reception unit 101 receives the two input images IA and IB from the imaging device (Step S101).

The depth (depth information), the three-dimensional motion (motion information), and the correspondence (correspondence information) are calculated using the input images (Step S102). For example, the depth calculation unit 111 calculates the depth and the reliability for each of the two input images. Furthermore, the motion calculation unit 112 calculates the per-pixel three-dimensional motion for the two input images. In addition, the correspondence calculation unit 113 uses the calculated depth, the calculated per-pixel three-dimensional motion, and the set camera parameters to calculate correspondence between the two input images on the basis of the geometric relationship.

The learning unit 121 uses results of the calculation (depth information, motion information, and correspondence information) in Step S102 and the training data to update the parameter PA, the parameter PB, and the camera parameters so as to optimize loss functions (Step S103).

The learning unit 121 determines whether to finish the learning (Step S104). For example, when each loss function has a value smaller than a threshold (threshold of function value) or the number of times of repetition exceeds a threshold (threshold of the number of times of repetition), the learning unit 121 determines to finish the learning.

When it is determined that the learning is not finished (Step S104: No), the process returns to Step S101 and repeated. When it is determined to finish the learning (Step S104: Yes), the learning process is finished.

Figure 6:
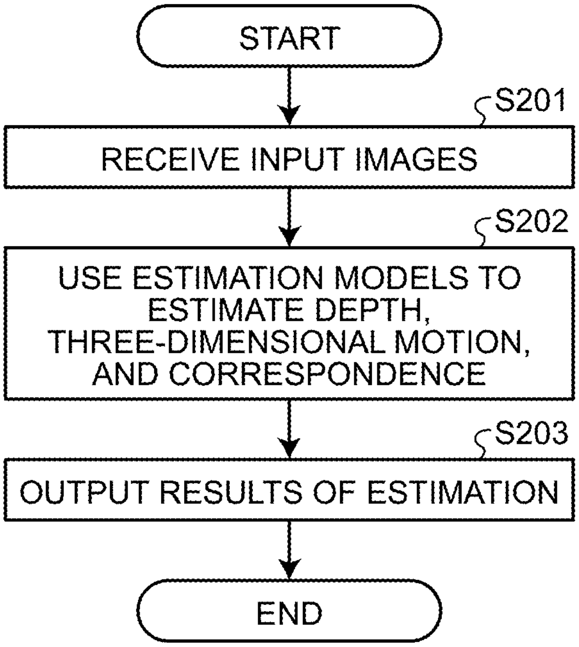
FIG. 6 is a flowchart of an estimation process according to an embodiment.

Next, an estimation process by the information processing apparatus 100 according to an embodiment will be described. FIG. 6 is a flowchart illustrating an example of the estimation process according to an embodiment.

The reception unit 101 receives input images to be estimated from the imaging device (Step S201). The estimation unit 122 uses the learned models (estimation model MA and estimation model MB) to estimate (calculate) the depth (depth information), the three-dimensional motion (motion information), and the correspondence (correspondence information) for the received input images (Step S202). Note that the estimation unit 122 may estimate some of these pieces of information.

The output control unit 102 outputs results of the estimation by the estimation unit 122 (Step S203), and finishes the estimation process.

As described above, in the information processing apparatus of the embodiment, not only the motion of the stationary part such as the background but also the motion (three-dimensional motion) of the moving object in the image are modeled, and geometric constraint is applied to the estimation model estimating the depth, for learning. This configuration makes it possible to bring the distance (depth) to the subject including the moving object closer to a desired value. Therefore, for example, the operation of the information processing apparatus 100 is applicable according to the subject captured in the image, and the accuracy of estimation of the distance (depth) to the subject can be improved.

Note that, for example, in a technology using an egomotion that models only stationary background, a depth estimation operation cannot be adapted to the subject such as the moving object. For example, when the subject such as the moving object is not modeled in a captured image, the subject such as the moving object may be erroneously recognized as the stationary background. Therefore, there is a possibility that a distance different from an actual distance is estimated as the distance to the subject such as the moving object.

Figure 7:
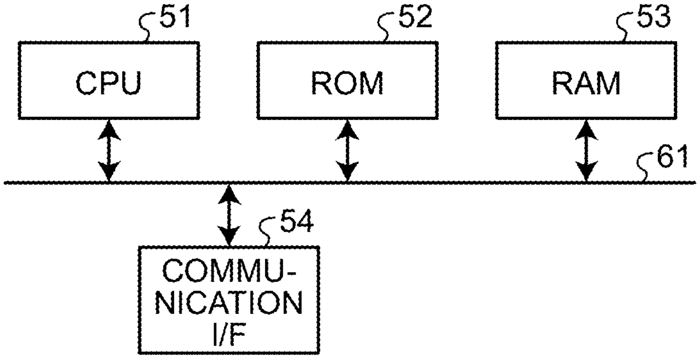
FIG. 7 is a hardware configuration diagram of the information processing apparatus according to an embodiment.

Next, a hardware configuration of the information processing apparatus according to an embodiment will be described with reference to FIG. 7. FIG. 7 is an explanatory diagram illustrating an exemplary hardware configuration of the information processing apparatus according to an embodiment.

The information processing apparatus of the embodiment includes a control device such as a central processing unit (CPU) 51, a storage device such as a read only memory (ROM) 52 and a random access memory (RAM) 53, a communication I/F 54 that is connected to a network to perform communication, and a bus 61 that connects the respective units.

Programs executed by the information processing apparatus of the embodiment is provided by being incorporated in the ROM 52 or the like in advance.

The programs executed by the information processing apparatus of the embodiment may be configured to be provided as a computer program product by being recorded in a computer-readable recording medium, such as a compact disk read only memory (CD-ROM), flexible disk (FD), compact disk recordable (CD-R), or digital versatile disk (DVD), in an installable or executable file format.

Furthermore, the programs executed by the information processing apparatus of the embodiment may be configured to be stored on a computer connected to a network such as the Internet so as to be provided by being downloaded over the network. Furthermore, the programs executed by the information processing apparatus of the embodiment may be provided or distributed over a network such as the Internet.

The programs executed by the information processing apparatus of the embodiment can cause a computer to function as the respective units of the information processing apparatus described above. The computer is configured so that the CPU 51 loads a program from a computer-readable storage medium into the main storage device to execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:

one or more hardware processors configured to:

input a first input image and a second input image that are captured by an imaging device, to a first estimation model into which an input image is input and from which depth information including a plurality of depths for a plurality of pixels included in the input image is output, and obtain first depth information for the first input image and second depth information for the second input image;

input the first depth information and the second depth information, to a second estimation model into which two pieces of the depth information are input and from which motion information indicating motion of each of a plurality of pixels in a three-dimensional space is output, and obtain the motion information;

calculate, by using the first depth information and the second depth information, the motion information, and camera parameters of the imaging device, correspondence information indicating correspondence between a first pixel included in the first input image and a second pixel included in the second input image;

update parameters of the first estimation model and the second estimation model to optimize a first loss function including a term indicating a difference between the correspondence information and correspondence training data that is training data concerning correspondence between the first pixel and the second pixel, a second loss function including a term concerning a depth, and a third loss function including a term indicating a difference in pixel value between the first pixel and the second pixel whose correspondence is indicated by the correspondence information; and update the first estimation model and the second estimation model represented by the updated parameters.

2. The information processing apparatus according to claim 1, wherein the first estimation model is a model that outputs the depth information and a reliability of the depth information, the one or more hardware processors input the first input image and the second input image, to the first estimation model, and obtain the first depth information and a first reliability for the first input image, and the second depth information and a second reliability for the second input image, and the second loss function indicates a difference between the first depth information and the second depth information, and depth training data that is training data concerning depth, and includes a term indicating that the larger the first reliability and the second reliability are, the larger a loss is.

3. The information processing apparatus according to claim 1, wherein the second loss function includes a term indicating a depth difference that is larger than a designated value, the depth difference indicating a difference in depth between two pixels in depth training data that is training data concerning depth.

4. The information processing apparatus according to claim 1, wherein the first estimation model is a model that outputs the depth information and a reliability of the depth information, the one or more hardware processors input the first input image and the second input image, to the first estimation model, and obtain the first depth information and a first reliability for the first input image, and the second depth information and a second reliability for the second input image, and the second loss function represents a weighted sum of:

a function indicating a difference between the first depth information and the second depth information, and depth training data that is training data concerning depth, and including a term indicating that the larger the first reliability and the second reliability are, the larger a loss is; and a function including a term indicating a depth difference that is larger than a designated value, the depth difference indicating a difference in depth between two pixels in the depth training data.

5. The information processing apparatus according to claim 1, wherein the one or more hardware processors update the camera parameters to optimize the first loss function, the second loss function, and the third loss function.

6. The information processing apparatus according to claim 1, wherein the one or more hardware processors update the parameters of the first estimation model and the second estimation model to optimize one or two of the first loss function, the second loss function, and the third loss function.

7. A generation method executed by an information processing apparatus, the generation method comprising:

inputting a first input image and a second input image that are captured by an imaging device, to a first estimation model into which an input image is input and from which depth information including a plurality of depths for a plurality of pixels included in the input image is output, and obtaining first depth information for the first input image and second depth information for the second input image;

inputting the first depth information and the second depth information, to a second estimation model into which two pieces of the depth information are input and from which motion information indicating motion of each of a plurality of pixels in a three-dimensional space is output, and obtaining the motion information;

by using the first depth information and the second depth information, the motion information, and camera parameters of the imaging device, calculating correspondence information indicating correspondence between a first pixel included in the first input image and a second pixel included in the second input image; and updating parameters of the first estimation model and the second estimation model to optimize a first loss function including a term indicating a difference between the correspondence information and correspondence training data that is training data concerning correspondence between the first pixel and the second pixel, a second loss function including a term concerning a depth, and a third loss function including a term indicating a difference in pixel value between the first pixel and the second pixel whose correspondence is indicated by the correspondence information, and updating the first estimation model and the second estimation model represented by the updated parameters.

8. A computer program product having a non-transitory computer readable medium including programmed instructions, wherein the instructions, when executed by a computer, cause the computer to execute:

inputting a first input image and a second input image that are captured by an imaging device, to a first estimation model into which an input image is input and from which depth information including a plurality of depths for a plurality of pixels included in the input image is output, and obtaining first depth information for the first input image and second depth information for the second input image;

inputting the first depth information and the second depth information, to a second estimation model into which two pieces of the depth information are input and from which motion information indicating motion of each of a plurality of pixels in a three-dimensional space is output, and obtaining the motion information;

by using the first depth information and the second depth information, the motion information, and camera parameters of the imaging device, calculating correspondence information indicating correspondence between a first pixel included in the first input image and a second pixel included in the second input image; and updating parameters of the first estimation model and the second estimation model to optimize a first loss function including a term indicating a difference between the correspondence information and correspondence training data that is training data concerning correspondence between the first pixel and the second pixel, a second loss function including a term concerning a depth, and a third loss function including a term indicating a difference in pixel value between the first pixel and the second pixel whose correspondence is indicated by the correspondence information, and updating the first estimation model and the second estimation model represented by the updated parameters.

9. An information processing apparatus comprising:

one or more hardware processors configured to:

input a first input image and a second input image that are captured by an imaging device to a first estimation model from which depth information including a plurality of depths for a plurality of pixels included in an input image is output, and obtain first depth information for the first input image and second depth information for the second input image;

input the first depth information and the second depth information to a second estimation model from which motion information indicating motion of each of a plurality of pixels in a three-dimensional space is output, and obtain the motion information;

calculate, by using the first depth information and the second depth information, the motion information, and camera parameters of the imaging device, correspondence information indicating correspondence between a first pixel included in the first input image and a second pixel included in the second input image;

update parameters of the first estimation model and the second estimation model based on a loss function including a term indicating a difference in pixel value between the first pixel and the second pixel whose correspondence is indicated by the correspondence information; and update the first estimation model and the second estimation model represented by the updated parameters.

10. The information processing apparatus according to claim 9, wherein the first estimation model is a model that outputs the depth information and a reliability of the depth information, and the one or more hardware processors input the first input image and the second input image to the first estimation model, and obtain the first depth information and a first reliability for the first input image, and the second depth information and a second reliability for the second input image.

11. The information processing apparatus according to claim 9, wherein the one or more hardware processors update the camera parameters to optimize the loss function.

12. The information processing apparatus according to claim 9, wherein the one or more hardware processors update the parameters of the first estimation model and the second estimation model to optimize the loss function.

* * * * *